United States Patent [19]

Stuttard et al.

[11] 4,270,202
[45] May 26, 1981

[54] MODEM WITH AUTOMATIC PORT RECONFIGURATION APPARATUS

[75] Inventors: Edward B. Stuttard; John E. Blackwell, both of Reading, England; Jessie Chao, Miami, Fla.

[73] Assignee: Racal-Milgo, Inc., Miami, Fla.

[21] Appl. No.: 8,511

[22] Filed: Feb. 1, 1979

Related U.S. Application Data

[63] Continuation of Ser. No. 795,876, May 11, 1977, abandoned.

[51] Int. Cl.³ .............................. H04J 3/16; H04J 6/02
[52] U.S. Cl. ........................................ 370/80; 370/112
[58] Field of Search ............ 179/15 BL, 15 A, 15 BV, 179/15 BW, 15 AS, 15 BA; 370/79, 80, 81, 84, 112, 113

[56] References Cited

U.S. PATENT DOCUMENTS

| Re. 28,577 | 10/1975 | Schmidt | 179/15 BA |
|---|---|---|---|
| 3,700,820 | 10/1972 | Blasbalg | 179/15 BA |
| 3,790,715 | 2/1974 | Inose | 179/15 BV |
| 3,927,268 | 12/1975 | Sciulli | 179/15 BW |

Primary Examiner—David L. Stewart
Attorney, Agent, or Firm—Jackson, Jones & Price

[57] ABSTRACT

Circuitry for automatically and dynamically reconfiguring the channel or port configuration of a modem handling a plurality of ports. A standard signal such as DTR (data terminal ready) is used to provide a code to a master modem indicating the particular port configuration requested by cooperating apparatus. The requested configuration code is continuously compared to a code stored by a shift register controlling the actual modem port configuration. When the requested code changes, an indication of the code change is transmitted to a communicating slave modem and a control signal is sent, after a suitable delay, to the shift register to conform its contents to the newly requested configuration code. During the delay, the slave modem switches to the newly requested configuration. The circuitry follows a defined sequence of configuration switching, dropping channels successively and adding channels by passing through the state where all channels are active. In an alternative system operation, each of two communicating modems may be synchronized by the cooperating apparatus such that a configuration charge need not be communicated across the transmission line.

22 Claims, 7 Drawing Figures

MODEM WITH AUTOMATIC PORT RECONFIGURATION APPARATUS

This is a continuation of application Ser. No. 795,876, filed May 11, 1977, and now abandoned.

BACKGROUND OF THE INVENTION

The subject invention relates generally to digital data communications and more particularly to apparatus employing multiplexing to combine a plurality of digital data channels for transmission over a single transmission path. The invention provides apparatus for automatically varying the channel configuration and is particularly useful in conjunction with digital data modems.

In the prior art, digital data modem apparatus is known for interfacing with data processing apparatus at either end of a transmission channel such as a telephone line. Multiport modems are also known which provide a plurality of channels for communication with a similar plurality of channels of the associated data processing apparatus. The multiple channel information is multiplexed for transmission over an individual line. Multiplexing is typically accomplished by TDM (time division multiplexing) with bit-by-bit interlacing of channels. Of course, many methods of multiplexing are known and could be used according to the invention.

In initiating communication across a transmission line between modems, it is generally known in the prior art to provide a sequence of initializing signals, in what is sometimes referred to as a "handshaking" operation. Such signals may indicate when a data source actually wants to transmit data or wants a channel at its disposal ready for transmission. An example of the former alternative currently in use is RTS (request to send or ready for sending). An example of the second alternative is DTR (data terminal ready) or DSR (data set ready). RTS is present only while a transmission is in progress, while DTR will be present throughout the time that the data source is engaged in interactive communication with a device such as a CPU. It is also known to provide DCD (data carrier detect) and RLSD signals (receive line line signal detect). It is known not only to provide DCD in the presence of a data carrier from a communicating modem but also to set DCD low upon receipt of a coded inverse of the RTS signal ($\overline{RTS}$). One commercially available modem incorporating the use of signals as described above is the Milgo 96 MM. Such signals may be particularly taken advantage of in accordance with the invention as will be presently described.

Known multiport modems contain the necessary circuitry for switching between various port configurations in response to commands set manually by an operator. Such channel allocation or port reconfiguration is useful when data traffic patterns differ relatively infrequently in a known manner. It is then possible to set up a mode switching schedule which requires the intervention of an operator from time to time to effect mode changes. Moreover the actions of two operations, one manually operating a modem at each end of the transmission line, must obviously be coordinated. To make more efficient use of the expensive telephone channels, it would be desirable to have a dynamic port reconfiguration capability wherein the data processing apparatus and modem system would cooperate to reconfigure ports rapidly and automatically within operator intervention.

SUMMARY OF THE INVENTION

It is therefore an object of the invention to reconfigure modem port configurations without manual intervention.

It is another object of the invention to automatically coordinate mode switching at two modems linked by a transmission path.

It is a further object of the invention to enable dynamic port reconfiguration, allowing a modem or multiplexer to adapt to changing traffic patterns flexibly and in an unscheduled manner so as to obtain the optimum use of available bandwidth at any given time.

To attain these and other objects of the invention, circuitry is provided which automatically detects a request from cooperating apparatus to change the multiplexing arrangement (port or channel configuration) and automatically provides control signals to cause the multiplexing apparatus to effect the desired change.

Further, according to the invention, when an apparatus having ports providing data input/output channels to a first data modem requests a change of port (channel) configuration, the request is detected, held and an indication thereof sent across a transmission path to serve as a port reconfiguration request to a second, cooperating modem. After a suitable delay to allow the second modem to switch to the proper port configuration, the first modem, originally presented with the port reconfiguration request by the data processing apparatus, switches to the new port configuration. The data modem or multiplexer at the end of the line where the request for a new port configuration originates is treated as the master unit while the multiplexer modem at the other end of the line is the slave. Port configuration mode switching is made demand-dependent so that when a data source does not demand a channel, its channel is reallocated to the active data sources.

According to another feature of the invention, a modem user can take advantage of master clocks in controlling data processing apparatus at two modem sites to synchronize operation between the two modems. Direct software synchronization is thus made available, removing the need to transmit synchronizing information.

Another important aspect of the invention is the provision of a sequencing technique for switching from one port configuration to the next utilizing handshaking signals presently employed in communication systems employing modems. Hardware simplification is thereby greatly facilitated and problems encountered in adding and deleting channels are overcome.

BRIEF DESCRIPTION OF THE DRAWINGS

The preferred embodiment and best mode contemplated for implementing the just summarized invention will now be described in conjunction with the drawings of which.

DETAILED DESCRIPTION OF THE PREFERRED EMBODIMENT

Figure 1:
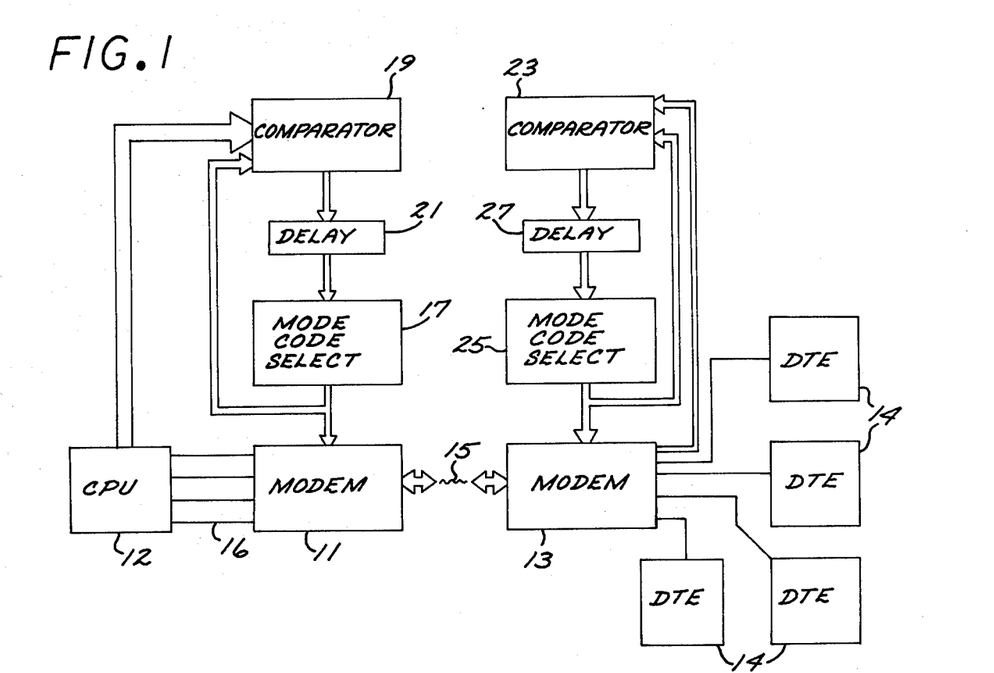
FIG. 1 is a simplified block diagram illustrating the apparatus of the preferred embodiment of the invention.

FIG. 1 illustrates a pair of modems 11, 13 communicating across a transmission channel 15. Each modem 11, 13 interfaces with a data processing apparatus such as a central processor, data terminal or other peripheral. For example, modem 11 may interface with a plurality of ports of a central processing unit (CPU) 12 while modem 13 interfaces with a plurality of ports of some form of data terminal equipment (DTE) 14. As known in the prior art, a multiport modem multiplexes a plurality of channels outputted by associated processing apparatus for communication over a transmission line. For example, a multiport modem may multiplex four ports 16, each transmitting at 2400 bits per second for an overall data rate of 9600 bits per second. The cooperating modem demultiplexes the single channel information. Typically a four wire line, two-way transmission system is utilized such that multiplex and demultiplex operations are performed at both ends of the transmission line.

In practice, it is often desirable to reconfigure the channel or port arrangement. For example, if two channels of a four port device are not currently necessary for transmitting data it is desirable to be able to effectively disable those two channels and allocate their bandwidth to channels which are actively transmitting. In this manner, more efficient data transmission is achieved.

Figure 2:
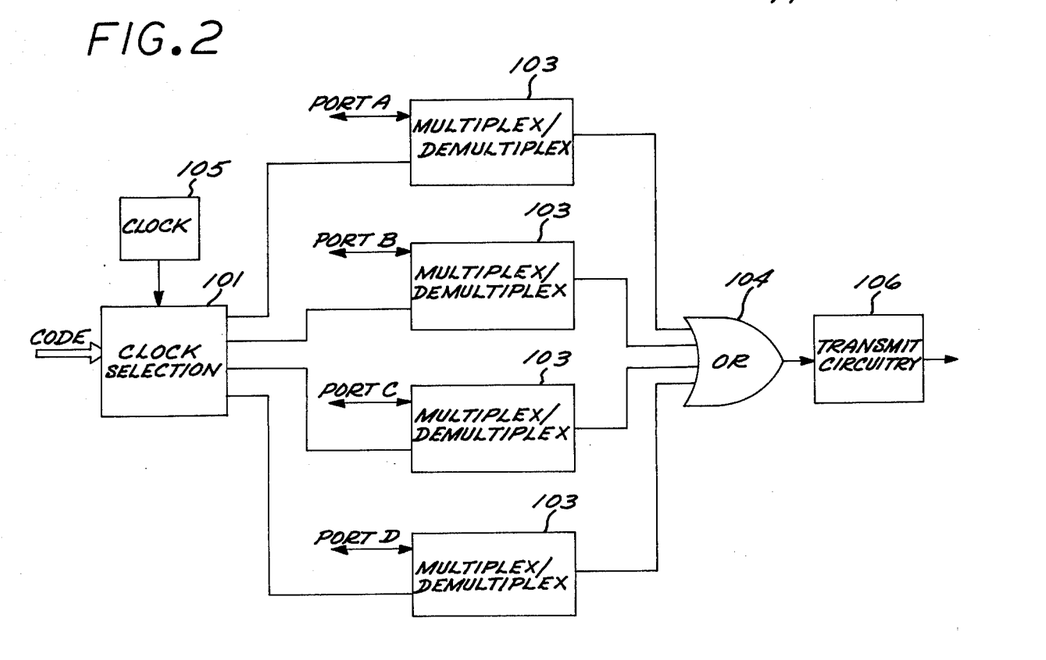
FIG. 2 is a block diagram of channel allocation circuitry.

As alluded to earlier, known multiport modems contain the necessary circuitry for switching between various port configurations in response to manually set commands. A typical method of data encoding for a multiport transmitter is indicated in FIG. 2. While FIG. 2 is somewhat simplified, those skilled in the art will readily recognize the manner of implementation of this circuitry.

As shown in FIG. 2, the bandwidth allocation in a four channel system may be determined by a multiplexer clock selection circuit 101 which selects clock signals to be fed to four multiplexer/demultiplexers 103. The clock selection circuit 101 is driven from a clock 105 and includes frequency dividers and logic circuits which derive four divided clock signals interlaced with one another in a cyclic four-phased clock sequence $\phi_1$, $\phi_2$, $\phi_3$, $\phi_4$. In response to a code, manually set in the prior art, the clock phases are selectively gated to the multiplexer/demultiplexers 103. The phased outputs of the multiplexer/demultiplexers are combined into a 9600 bits per second signal on a single line by an OR gate 104. The OR gate 104 supplies the 9600 bits per second data to modem transmitting circuitry 106 where the data is modulated according to known methods.

For example, if only two channels A, B of four channels A, B, C, D are required to transmit data, two clock phases are gated to the multiplexer for those respective channels A, B, thereby doubling the bit rate output on those two channels A, B while the other two channels C, D are inactive.

A manner for interlacing the data bits at various speeds is illustrated in the following table:

TABLE A

| Speed | Mode | Channel Data Rate | | | | Data Framing |
|-------|------|------|------|------|------|------|
|       |      | A    | B    | C    | D    |      |
| 9600 | 2 | 4800 | 4800 | — | — | $A_0,B_0,A_1,B_1,A_2,B_2,A_3$, $B_3,A_4,B_4,A_5,B_5,A_6,B_6$, |
| 9600 | 4 | 2400 | 2400 | 2400 | 2400 | $A_0,B_0,C_0,D_0,A_1,B_1,C_1$, $D_1,A_2,B_2, C_2,D_2,A_3B_3$, $C_3,D_3$. |
| 9600 | 4 | 7200 | 2400 | — | — | $A_0,A_1,A_2,B_0,A_3,A_4,A_5$, $B_1,A_6,A_7,A_8,B_2,A_9, A_{10}$, $A_{11},B_3$. |
| 9600 | 5 | 4800 | 2400 | 2400 | — | $A_0,B_0,A_1,C_0,A_2,B_1,A_3$, $C_1,A_4,B_2,A_5,C_2,A_6,B_3$, $A_7,C_3$. |
| 7200 | 2,4,5 | 4800 | 2400 | — | — | $A_0,A_1,B_0,A_2,A_3,B_1,A_1$, $A_5,B_2,B_2,A_6,A_7,B_3$. |
| 7200 | 3 | 2400 | 2400 | 2400 | — | $A_0,B_0,C_0,A_1,B_1,C_1,A_2$, $B_2,C_2,A_3,B_3,C_3$. |
| 4800 | 2,3,5 | 2400 | 2400 | — | — | $A_0,B_0,A_1,B_1,A_2,B_2,A_3$, $A_3$. |

In accordance with the preferred embodiment of the invention, a modem 11 operating as a master modem receives a port configuration or channel allocation request in coded form from cooperating data processing apparatus such as a CPU 12. The present port configuration is controlled by a code supplied by a mode shift register 17 or other storage device. The code provided by the shift register 17 selects the port configuration as does the code provided by manual selection in prior art multiport modems. A comparator 19 continually compares the port configuration request of the CPU 12 to that indicated by the mode shift register 17. Should the CPU request a different port configuration than that indicated by the shift register 17, the comparator 19 generates shift register control signals, indicative of a new mode code to be provided by the register 17. After a suitable delay provided by timing apparatus 21, the shift register control information is used to change the mode-indicating code in the shift register 17, thus establishing a new port configuration in the multiport modem 11.

The delay provided by the timing apparatus 21 serves to provide a sufficient interval for the second or slave modem 13 to respond and set up a port configuration corresponding to the newly requested port configuration in the master modem 11. During this time interval, the master modem 11 transmits signals to the slave modem 13 which are interpreted as a transmitted port configuration request by the modem 13. Apparatus functioning similarly to that at the master modem 11 is then used to set the port configuration of the slave modem 13. In particular, comparison apparatus 23 detects the new port configuration request by comparing the request code to the mode indicated by the shift register 25. Again the comparator 23 generates shift register control information, which after a suitable delay adjusts the mode indication provided by the shift register 25 in order to alter the port configuration of the modem 13.

Figure 3:
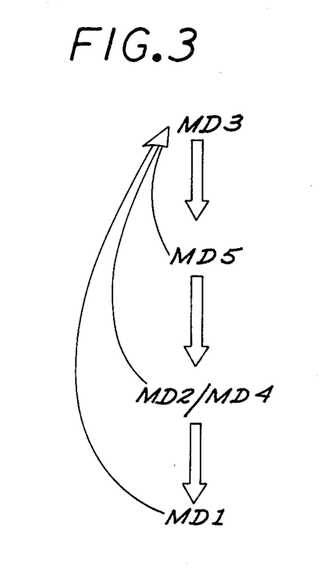
FIG. 3 illustrates a port configuration selection sequence according to the preferred embodiment of the invention.

In implementing the apparatus just described with reference to FIG. 1, it is found very advantageous to establish a channel priority and reconfiguration discipline in order to simplify the circuitry and utilize existing modem line disciplines. Thus, a port configuration mode selection sequence is established according to the preferred embodiment of the invention, as illustrated in FIG. 3 and Table I below:

TABLE I

| SPEED | PORT REQUEST | | | | RESULTANT MODE | RESULTANT PORT CONFIGURATION | | | |
|---|---|---|---|---|---|---|---|---|---|
| | A | B | C | D | | A | B | C | D |
| 9600 | 1 | X | X | 1 | 3 | 24 | 24 | 24 | 24 |
| ↓ | ↓ | X | 1 | 0 | 5 | 48 | 24 | 24 | |
| ↓ | ↓ | 1 | 0 | 0 | 4 or 2 | 72 | 24 | | |
| ↓ | ↓ | 0 | 0 | 0 | 1 | 96 | | | |
| 7200 | 1 | X | 1 | X | 3 | 24 | 24 | 24 | |
| ↓ | ↓ | 1 | 0 | | 5 | 48 | 24 | | |
| ↓ | ↓ | 0 | 0 | | 1 | 72 | | | |
| 4800 | 1 | 1 | X | X | 3 | 24 | 24 | | |
| ↓ | ↓ | 0 | | | 1 | 48 | | | |

Table I illustrates various exemplary port configurations at various data rates. By way of example, the ensuing description will consider the 9600 bit per second speed. The table indicates the mode code consisting of four bits representative of four ports or channels A, B, C and D. The code consists of 1's, 0's and "don't cares" indicated by the character "X". The port configuration corresponding to a particular mode code lies in the same row as the mode code. Additionally, each mode is given an arbitrary number, 1 through 5.

As Table I illustrates, in mode 3, each of the channels A, B, C and D is transmitting at 2400 bits per second. In mode 5, channel D is dropped as indicated by the "0" in the mode code channel under column "D". Channels B and C transmit at 2400 bits per second, while channel A operates at 4800 bits per second when channels A and B are operative, one of two modes 4 or 2 may be selected. In mode 4, the channels A, B are selected to operate at 7200 bits per second and 2400 bits per second, while in mode 2 they operate at 4800 bits per second and 4800 bits per second, respectively. Finally, in mode 1, the mode selection code indicates that only channel A is to be operative and that channel A operates at 9600 bits per second.

Thus, according to the preferred embodiment as illustrated by Table I, the channels are given a priority descending from A to D. The lowest priority channel which is operating dictates the mode. For example, mode 3 is determined solely by whether channel D is operating and is not dependent upon whether channels B and C are indicated as being operative or inoperative. Channel A is the most favored channel, and its rate of transmission continuously increases as other channels drop out.

As alluded to above, the automatic port configuration circuit of the preferred embodiment of the invention compares the channels requested by the newly presented request code vs. the channel active signals. If ports have to be added or deleted, the proper signals are generated to force the remote (slave) modem to switch in the same manner as the local (master) modem. Both master and slave modems are controlled to go through the same sequence in order to arrive at the proper port configuration. According to the preferred embodiment, the sequence is determined according to the flow shown in FIG. 3. According to this sequence, a modem operating in any of the modes 5, 4/2 or 1 may add the channels necessary to return directly to mode 3. However, to move up the sequence of any other mode, for example, from mode 1 to mode 5 requires that an intermediate return to mode 3 be made before progressing the mode 5. In addition, progressing down the sequence from a higher level mode to a lower lever mode requires stepping through any intermediate modes. This technique of sequencing proves to be advantageous in facilitating the signaling technique used to communicate mode changes to the slave or remote modem.

This signaling technique is the use of a DCD (data carrier detect) drop in the slave modem to cause the port configuration circuit at the slave to drop channels to achieve a new mode. According to the scheme already explained, it is always the least significant port which determines when the slave is to fall back. Because a channel which has been dropped is no longer being used at all, there is no easy way of returning directly to a mode where that channel is again active because the time division slot for that channel has been reassigned. Therefore, to reactivate a channel according to the preferred embodiment, the port configuration circuit returns to mode 3 wherein all channels are active and proceeds to remove active channels until the desired state is reached. Since channel A is always active, the DCD drop code for that channel (denoted $\overline{ADCD}$) is used to signify and initialize a return to the highest mode, mode three. From mode three, the normal DCD channel dropping sequence is used to fall back to the proper configuration.

Figure 4:
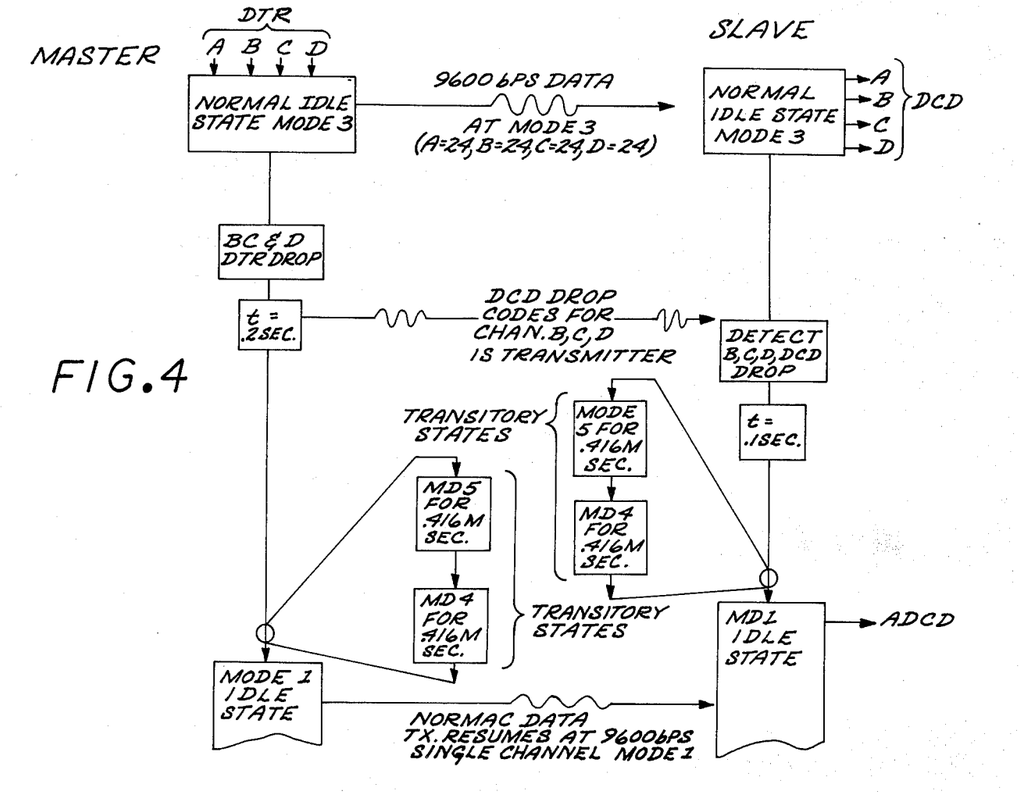
FIG. 4 is a flow chart illustrating the operation of the preferred embodiment of the invention in dropping channels from active to inactive status.
Figure 5:
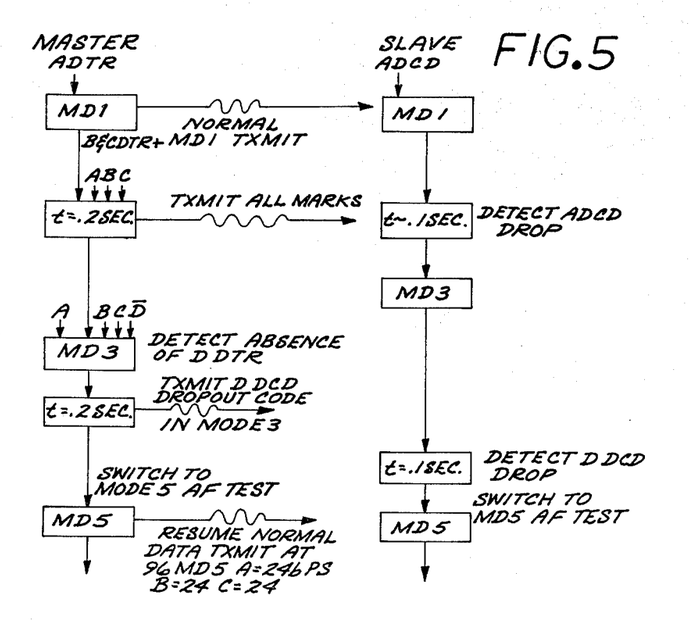
FIG. 5 illustrates the operation of the preferred embodiment of the invention in adding channels from an inactive to an active status.

An example of the just described sequencing technique is illustrated in FIGS. 4 and 5. In this example, DTR (data terminal ready) is used as the control code at the master site, which is originally configured in mode 3 and then changes to mode 1 and then to mode 5.

FIG. 4 illustrates the dropping of channels from mode 3 to mode 1. Initially, the master modem is in the normal idle state of mode 3 wherein the DTR signals for channel A and channel D are logical ones according to the logic conventions of Table I. Similarly, the slave modem is in the idle state of mode 3, the DCD levels of channel A and channel D representing logical ones. A change to mode 1 is initiated by the master when the DTR levels for channels B, C, and D drop to zero at the same time. A delay of 200 milliseconds (ms) ensues, during which the DCD drop out code for channels B, C, and D is transmitted to the slave modem. A timed delay of 100 ms is provided in the slave modem for the slave to detect the DCD drop and start the change through mode 5 and 4 eventually reaching mode 1. Preferably, the intermediate modes, such as 5, 4 are passed through rapidly as indicated by the 0.416 msec time in FIG. 4. Due to the longer delay at the master, the slave is set up in mode 1 before the master falls back to mode 1. In this manner, it is assured that the slave is ready for the operation of the new master configuration. In a similar manner, any number of active ports can be dropped. When the master falls back to mode 1, normal transmission at 9600 bits per second is resumed on the single A channel.

FIG. 5 illustrates the process of adding ports as the system goes from mode 1, where only channel A is operative, to mode 5, wherein channels A, B, and C are operative. Initially the master modem is in mode 1 with the DTR signal for channel A being positive. Similarly, the slave modem is in mode 1 with the DCD signal for channel A being positive. The change to mode 5 is initiated when the DTR signals for channels B and C go high. A delay of about 200 ms is then provided during which the master transmits all marks to the slave, indicating the drop of the DCD signal for channel A. A delay of 100 ms is then provided at the slave after the drop-out detection during which time the slave switches into mode 3 wherein all four channels are operative. Again, the slave reaches mode 3 before the master switches into mode 3 due to the arrangement of the delay timings.

Once the master is in mode 3, it detects that mode 3 is still improper because the D channel DTR signal is low. The procedure of FIG. 4 is then essentially repeated to drop channel D to return to mode 5. The DCD drop code for channel D is transmitted to the slave, which drops to mode 5 after a delay. A longer delay is provided at the master so that the master switches to mode 5 after the slave and resumes normal transmission over channel A at 4800 bits per second, channel B at 2400 bits per second, and channel C at 2400 bits per second. Thus, FIG. 5 illustrates the technique for returning to the mode wherein all channels are active in order to add ports.

In the above discussion, the use of the DTR and DCD signals has been employed because they are typical signals recognized in transmission between modems. However other signals could be used to provide mode codes to the master and slave modems. For example, the signal known as RTS (request to send) may be used at the master to indicate the mode code as well as the DTR level described above.

As already mentioned, a demand signal may indicate when a data source actually wants to transmit data or wants a channel at its disposal ready for transmission. An example of the former alternative currently in use is RTS. An example of the second alternative is DTR (data terminal ready). Which signal is used as the demand signal from any data source will depend largely upon the nature of the source. If the source is of the kind, e.g. a tape reader, which predominantly transmits in lengthy blocks of some minutes duration alternating with similarly lengthy quiescent periods, it will normally be satisfactory to use RTS as the demand signal. RTS is present only while a transmission is being effected and the use of RTS will allow a bandwidth reallocation to be usefully made in the lengthy periods when the data source is not transmitting and RTS is absent.

Such a procedure will normally be inappropriate when the data source is an interactive source, such as a data processing terminal, because an interactive source tends to switch rapidly between transmitting and quiescent states and concomitant rapid mode switching is undesirable. In this case the demand signal can be DTR which will be present throughout the time that the data source is engaged in interactive communication with the device, such as a CPU (central processing unit) at the slave end of the line. Bandwidth reallocation will then only occur when the data source drops DTR because it no longer wants to be in communication with the CPU.

As also alluded to above, it is known not only to provide DCD in the presence of a data carrier from the master modem but to set DCD low on receipt of coded RTS. A conventional format for coded RTS is a train of all ones for a predetermined interval which may be about 200 ms in the case of channels B, C and D, although it is also possible for a specific digital code word to be assigned to coded RTS.

The slave modem detects coded RTS in channels B, C and D. As described above, this action is delayed to ensure reliable detection (otherwise detection could arise falsely from a longish train of all ones arising during normal data transmission).

Figure 6:
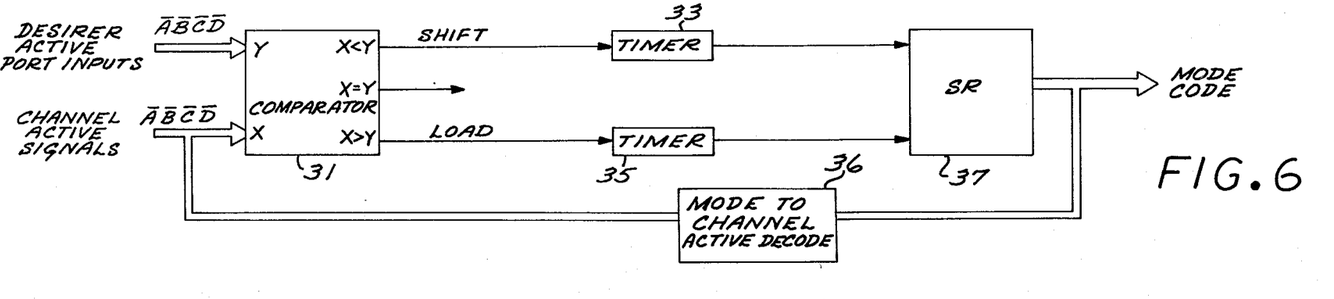
FIG. 6 is a generalized block diagram illustrating a port configuration selection circuit according to the preferred embodiment of the invention.

FIG. 6 illustrates a simplified block diagram of a generalized circuit providing port configuration control in a master or slave modem according to the sequencing and coding technique just described in connection with FIGS. 3 through 5. This circuit includes a magnitude comparator 31, two timers 33, 35 and a mode-indicating shift register 37. The magnitude comparator 31 compares the inverse of the channel active signals B, C, and D provided by the mode-indicating shift register 37 to the inverse of the port DTR signals (master) or the port DCD signals (slave). Th channel active signals are supplied by translating the shift register output code in a decoder 36. The inputs to the magnitude comparator 31 are labeled collectively X and Y, respectively.

The relation of X and Y indicates the nature of the channel reconfiguration required. For example, if it is necessary to go from mode 1 to mode 5, the input $\overline{ABCD}$ to X will be 0111 whereas the inputs $\overline{ABCD}$ at Y will be 0001. In this case, X>Y, the shift register is automatically loaded with the mode 3 indication. The load mode 3 signal is delayed by the timer 35 which times out an interval as discussed above with respect to FIGS. 4 and 5. On the other hand, if X is less than Y the indication is that a channel needs to be deleted. In this case, the shift register 37 is merely stepped to the next mode code, after a suitable delay provided by the timer 33. If after one step, the comparison X<Y is still true, the shift register 37 will be again stepped to attain the next mode. When X finally equals Y, an idle state exists wherein the mode requested is equal to the active channel configuration (channel active mode). Of course, it will be appreciated that in this discussion, the importance of the comparison function is to determine whether channels need to be added or deleted. Various logical schemes and conventions may be derived to provide this indication from the pertinent channel codes without departing from the scope of the invention.

Figure 7:
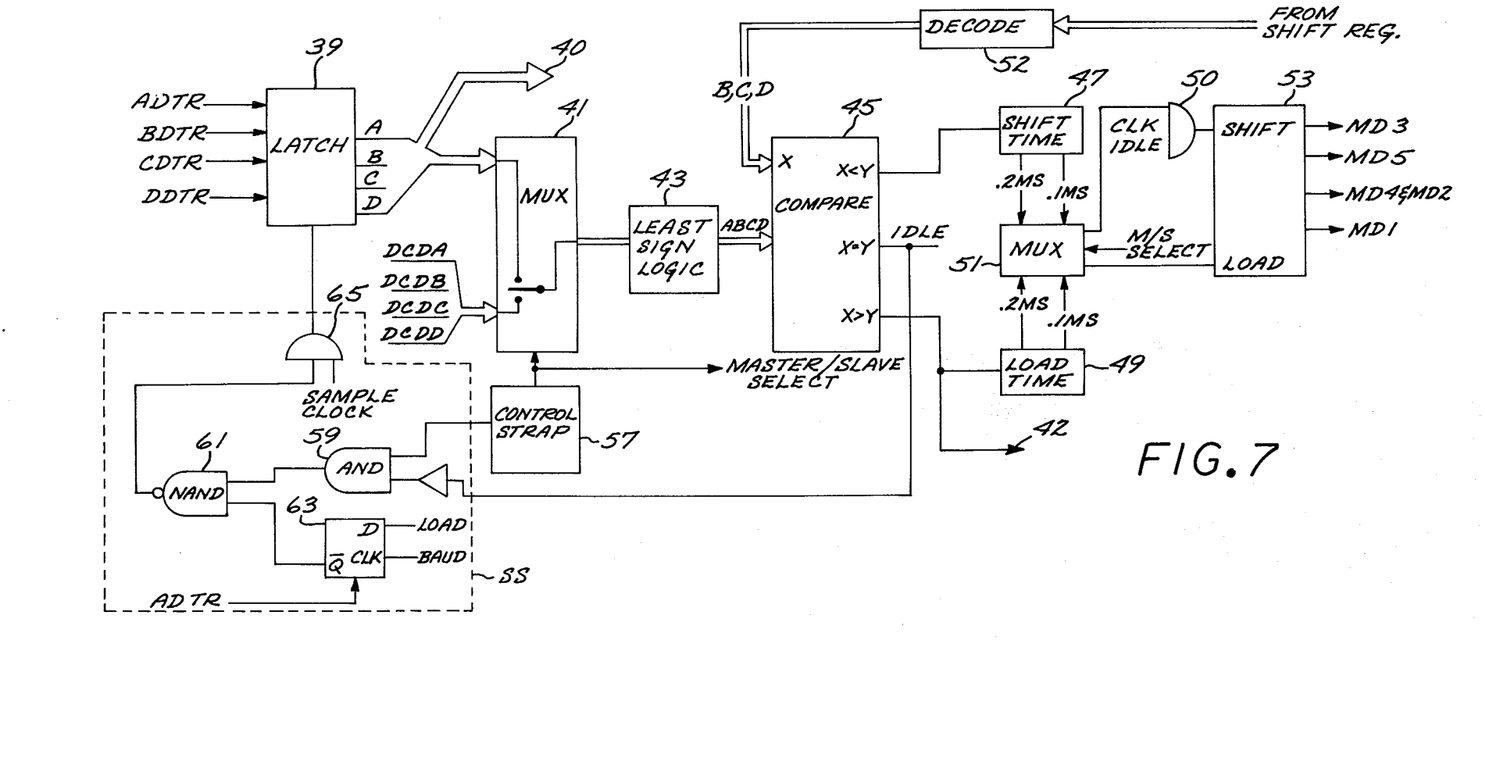
FIG. 7 is a schematic diagram illustrating a port reconfiguration circuit for use at either the master or the slave modem according to the preferred embodiment of the invention.

FIG. 7 illustrates in detail a circuit according to the preferred embodiment of the invention which may operate as either the master or slave reconfiguration control. The master/slave selection is made by a control strap which controls multiplexers, as will be discussed below.

In the master mode, the control signals, for example the DTR signals from four ports 16, are presented to a four bit latch 39. The contents of this latch 39 are transmitted by a multiplexer 41 to least significant port control logic 43 and then to a comparator 45. The comparator compares the channel active signals at input X to the output of the least significant port control logic 43 and provides output control signals to a shift timer 47 or a load timer 49. The shift timer and load timer 49 are connected through a multiplexer 51 to control a mode-indicating shift register 53. The equivalent X=Y or idle output of the comparator 45 is fed back to latch control logic 55 which controls operation of the latch 39.

A control strap 57 selects between the master and slave modes of operation of the circuit. In the master mode of operation, the multiplexer 41 is caused to transfer the output of the four-bit latch 39 to the least significant port control logic 43. In the slave mode, the multiplexer 41 gates the DCD signals from a bus to the least significant port control logic 43. The control strap also causes the multiplexer 51 to gate the 200 ms output of the shift timer 47 and the 200 ms output of the load timer 49 to the mode shift register 53 in the master mode. In the slave mode, the 100 ms outputs of the load and shift timers are selected by the multiplexer 51. The multiplexers function as gating switches and are well-known in the art.

In the master mode, the latch 39 is normally sampled at a high rate. However, when a change in condition is detected such that the idle output of the comparator 45 no longer indicates that X=Y, the latch control logic 55 causes the latch 39 to hold or latch the new requested mode indication.

The latch control logic 55 includes an AND gate 59, a NAND gate 61 and a delay, flip-flop 63. The AND gate 59 receives an input indicating X≠Y and an input indicating the master mode has been selected. Assuming these conditions are satisfied the output of the AND gate 59 is high as is the output of the normally reset delay flip-flop 63. In this event, the NAND gate 61 produces a low output which indicates the latch condition and disables the sample clock via an AND gate 65. As may be noted, when X≠Y or the master mode is not selected, the output of the NAND gate 61 will be high indicating the sample mode for the latch 39.

The delay flip-flop 63 is provided to assume proper operation when mode three is selected. In this event, ADTR will change (go low as here discussed) to signal the slave modem. To prevent the comparator from erroneously detecting inequality and latching the low ADTR signal, the delay flip-flop responds to a load command to inhibit latching until ADTR resumes its original (high) state. As shown in FIG. 7, this operation is accomplished by clocking the delay flip-flop at the baud rate, supplying its D input with the load command and its reset input with the ADTR signal.

The latch 39 thus functions to prevent any interrupts or change in inputs until the port-configuring circuit has completely processed previous changes. In this manner, control signals may be generated and sent to the slave and completed before new interrupts for new port allocation reqeusts are honored.

The code selected by the multiplexer 41 is then transmitted to the least significant port control logic 43 wherein the least significant channel is given priority. The least significant channel present will force the more significant channel information to the active state, essentially filling in the "don't care" states in Table I. Channel A information is not affected by this circuit. The operation and structure of the least significant logic gating is represented by the following Table II.

TABLE II

| INPUT (RTS/DCD)* | | | | OUTPUT (TO MAG. COMP)* | | | |
|---|---|---|---|---|---|---|---|
| A | B | C | D | A | B | C | D |
| A | X | X | 0 | A | 0 | 0 | 0 |
| A | X | 0 | 1 | A | 0 | 0 | 1 |
| A | 0 | 1 | 1 | A | 0 | 1 | 1 |
| A | 1 | 1 | 1 | A | 1 | 1 | 1 |

*NOTE: NEGATIVE LOGIC

As mentioned earlier, the magnitude comparator, which may be a standard digital comparator provides X>Y, X<Y and X=Y outputs. These indicate respectively that a channel mode requested is that which is currently configured. The idle or X=Y output of the comparator 45 is returned to control the latch control logic 55. The condition X≠Y initiates the latch operation. The X<Y output goes to the shift timer 47, which provides a shift command to the mode shift register 53 after a time duration selected by the multiplexer 51 as explained above. The X<Y load indication triggers a load timer 49 which causes the mode 3 code to be loaded into the shift register 53 after the period of time selected by the multiplexer 51. The shift timer and load timer may both be conventional counter circuits.

Upon receiving a shift command from the shift timer 47, the shift register rapidly shifts through tis output states until equality is detected by the comparator 45. This function is represented logically in FIG. 7 by an AND gate 50, which in response to the shift signal from the timing apparatus 47 gates a clock to the shift register until the IDLE output is produced by the comparator 45. If, upon loading mode 3, equality does not result, the X<Y output of the comparator 45 is activated, instituting the shift sequence just described.

When not in the shift or load states, the mode shift register 53 simply holds the mode indication at its outputs. The mode indication may be applied to a suitable strap to select either mode 2 or mode 4.

Thus, in overall operation in the master mode, when a new channel configuration is requested, the comparator 45 outputs either a shift or a load command. These commands are suitably delayed by the timers 47, 49. During this delay, signals are sent across the channel to the slave modem. In particular, channel drops are detected from the output of the four bit latch 39 and the appropriate drop code sent. Apparatus for sending the drop code is fed with the latch output via lines 40, and is well-known in the art. When it is necessary to load mode 3, the code sent to the slave modem is sent upon detection of the load indication from the comparator 45 on line 42. At the end of the timing cycle as determined by the timers 47, 49 the proper shift or load command is sent to the shift register 53. The mode of the shift register is then returned to the comparator 45 to determine whether another change in the shift register contents is required or whether an equal condition has now been achieved.

In the slave configuration, the latch 39 is switched out by the multiplexer 41. The basic circuit operation is still the same with the exception that the DCD signals are presented to the least significant bit logic and the comparator 45. The timer multiplexer 51 selectes a shorter duration and a DCD command must be present for the duration of the timing cycle in order for the circuit to react.

According to the invention, other methods may be used to synchronize the port configuration switching at physically separated modem sites. One such method is to provide an FSK (frequency shift keyed) secondary channel or a totally independent data path for transmitting the synchronizing information. Such a channel path can be provided internally to the data set or by external equipment.

In another method the modem user can synchronize two systems by requiring port configuration simultaneously at previously determined times. For example, at the end of the day the apparatus cooperating with each physically separate modem such as a computer or data terminal (DTE), may assign a particular channel for a specific transfer of data. Since the modem-controlling apparatus at each site has a master clock, synchronization in accordance with these master clocks is a simple matter. Because of the synchronized master clocks at each modem site, there is no need for signalling between the two data sets. The data sets are each strapped to follow the request presented at the data terminal equipment (DTE) interface. Since each modem is under master control, this shychronizing technique is called master/master. By operating in the master/master mode, a user can effect direct softward control of the port configuration by supplying his own synchronization codes.

As is apparent from the above discussion, many modifications and alterations may be made in the above described preferred embodiment without departing from the scope and spirit of the invention. Therefore it is to be understood that, within the scope of the appended claims, the invention may be practiced other than as specifically described herein.

What is claimed is:

1. In a multiple port data modem having a communication channel per port adapted to receive one of a plurality of channel requests from associated equipment, apparatus for reconfiguring the channel-port assignments, comprising:

means for multiplexing a plurality of channels in one of a plurality of configurations, wherein said channels have a priority order of 1 to N with 1 being the highest priority, and the number of multiplexing configurations are N with a priority order of 1 to N, said means being responsive to first control signals for selecting the particular channel configuration to be adopted; and means for detecting new channel request signals supplied by said associated equipment and generating control signals to said multiplexing means to switch said multiplexing means to a new channel configuration wherein the lowest priority channel present in the channel configuration requested by the channel request signal is active.

2. The apparatus of claim 1 wherein said means for detecting comprises:

means for comparing the channel configuration requested by said associated equipment to the current channel configuration of said multiplexing means; and means responsive to a difference between the requested channel configuration and the current channel configuration to produce said first control signals.

3. The apparatus of claim 2 wherein said channel configuration requests are encoded and said means for comparing comprises:

means for storing one of a plurality of codes representative of the current channel configuration of said multiplexing means and responsive to second control signals for replacing said one code with another of said plurality of codes; and means supplied with said one code and with said encoded channel configuaration requests for detecting a requested change in channel configuration and responsive to said detection to produce said second control signals.

4. The apparatus of claim 3 wherein said plurality of codes and encoded requests have different formats and wherein said means supplied with said one code comprises:

means for translating said code and said encoded requests to a common code format resulting in first and second common-format codes; and a comparator receiving inputs of said first and second common-format codes for producing said second control signals.

5. The apparatus of claim 3 wherein said second control signals comprise an add control signal indicating that a channel is to be added, a drop control signal indicating that a channel is to be dropped and a third signal indicating that the actual channel configuration is the one represented by the current channel configuration request.

6. The apparatus of claim 5 wherein said means for storing includes shift register means whose output provides said plurality of codes, said shift register means being responsive to said add and drop control signals for changing the configuration code at its output.

7. The apparatus of claim 6 wherein said shift register means shifts in response to the drop control signal and wherein said shift register loads a code indicating all channels are operative in response to said add control signal.

8. The apparatus of claim 7 wherein said plurality of codes are encoded requests are of different formats and wherein said means supplied with said one code comprises:

means for translating said code and said encoded requests to a common code format resulting in first and second common-format codes; and a comparator receiving inputs of said first and second common-format codes for producing said add, drop and third control signals.

9. The apparatus of claim 8 wherein said means supplied with said one code further includes means for delaying said add and drop control signals.

10. The apparatus of claim 9 further including means for selectively adapting said apparatus to operate as a master or slave.

11. The apparatus of claim 8 wherein said means supplied with said one code further includes latch means responsive to said third control signal to latch a new channel configuration request.

12. The apparatus of claim 1 wherein said reconfiguring apparatus responds to new channel configuration requests provided in the format of modem handshaking signals.

13. The apparatus of claim 12 wherein said handshaking signals comprise request to send signals.

14. The apparatus of claim 12 wherein said handshaking signals comprise data carrier detect signals.

15. In a multiport data modem adapted to receive a plurality of port configuration requests, the apparatus comprising:

means for storing a first code and for controlling the present port configuration in response to said first code; and means responsive to a new port configuration request for changing said first code by one bit when said new port configuration request indicates a port is to be dropped and for inserting a code representing all ports being active when said new request indicates at least one port is to be added.

16. Digital-data multiplex apparatus having a given bandwidth capability and adapted to be supplied with demand signals from associated apparatus, said multiplex apparatus comprising:

a plurality of N data ports, wherein each data port has a priority order of 1 to N, 1 being the highest priority;

a line port operating in multiplex relationship with said data ports;

mode selection means operative to assign channels, within the available bandwidth, to different combinations of less than N and N of said data ports;

a plurality of N demand terminals, one for each of said data ports, for receipt of demand signals from the associated data apparatus coupled to said ports; and mode switching means, responsive to said demand signals on said demand terminals for controlling said mode selection means to automatically select a mode so that the highest priority data port having a demand signal associated therewith is assigned any bandwidth not demanded by said demand signals.

17. Apparatus according to claim 16, operable as a master apparatus and including means for delaying switching from an existing mode to a new mode in response to a change of demand signals, and means operative upon the disappearance of a demand signal to transmit a code signal, while the apparatus remains in said existing mode, in the channel corresponding to the last said demand signal, for indicating the disappearance thereof.

18. Apparatus according to claim 17, including means operative on the appearance of a demand signal corresponding to any channel to transmit a code signal indicative thereof in the channel corresponding to the port of highest priority order.

19. Apparatus according to claim 16, operable as a slave apparatus, and including means responsive to a predetermined code signal received in the channel corresponding to the port of least priority within an existing mode to switch to the mode of next higher priority.

20. Apparatus according to claim 19, further including means responsive to a predetermined code signal received in the channel corresponding to the port of highest priority to switch to the mode of lowest priority.

21. Apparatus according to claim 16, wherein said selection means comprises a shift register with N stages corresponding in priority order to said N modes, a shift input to said register for shifting a bit therein in the direction of higher priority, and a preset input to said register for presetting a bit in the lowest priority stage, and wherein said mode switching means comprises means for providing mode-indicating signals corresponding to the state of said shift register, and comparison means for comparing said demand signals with said mode-indicating signals to provide a first output when the compared signals differ in a first manner indicating that the existing mode is too low and to provide a second output when the compared signals differ in a second manner indicating that the existing mode is too high, and means for applying signals to said shift input and said preset input in response to said first and second outputs respectively provided by said comparing means.

22. A modem system comprising a master modem, a slave modem and a transmission path therebetween, each modem including multiplex means, a plurality N of data ports and a line port coupled to said transmission path and operating in multiplex relationship with said data ports, said data ports of each modem having a priority of 1 to N, with 1 being the highest priority, each modem further including selection means operative to assign channels occupying together a given bandwidth to different combinations of N and less than N of said data ports in corresponding different modes, said modes comprising N in number with the priority order of 1 to N, said master modem further including a plurality N of demand terminals for receipt of externally imposed demand signals, one for each of said data ports, mode switching means responsive to said demand signals to control said mode selection means of said master modem for automatic selection of modes to assign the available bandwidth to data ports 1 to N according to a mode priority order 1 to N as directed by the lowest priority demand signal received, and control means for transmitting to said slave modem control signals indicative of demand signal changes at said master modem, said slave modem including status latch means responsive to said control signals to store further demand signals corresponding to said demand signals at said master modem, and mode switching means responsive to said further demand signals to control said mode selection means of said slave modem for automatic selection of modes in accordance with further demand signals actually present.

* * * * *

UNITED STATES PATENT AND TRADEMARK OFFICE
CERTIFICATE OF CORRECTION

PATENT NO. : 4,270,202

DATED : May 26, 1981

INVENTOR(S) : Edward B. Stuttard, John E. Blackwell and Jessie Chao

It is certified that error appears in the above—identified patent and that said Letters Patent is hereby corrected as shown below:

1. Column 4, line 11, after "$B_6$," insert -- $A_7, B_7$ --

2. Column 8, line 13, delete "Th" and insert -- The --

3. Column 12, line 16, delete "codes are" and insert -- codes and --

Signed and Sealed this

Fifteenth Day of September 1981

[SEAL]

Attest:

GERALD J. MOSSINGHOFF

Attesting Officer

Commissioner of Patents and Trademarks